(12) United States Patent
Schwab

(10) Patent No.: US 8,557,436 B2
(45) Date of Patent: Oct. 15, 2013

(54) MOUNTING ARRANGEMENT FOR A BATTERY PACK

(75) Inventor: Leo F. Schwab, Fraser, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 688 days.

(21) Appl. No.: 12/765,921

(22) Filed: Apr. 23, 2010

(65) Prior Publication Data

US 2011/0262801 A1  Oct. 27, 2011

(51) Int. Cl.
*H01M 2/10* (2006.01)

(52) U.S. Cl.
USPC ............................ 429/187; 429/186; 429/163

(58) Field of Classification Search
USPC ............................ 429/163, 186, 187, 96, 100
See application file for complete search history.

(56) References Cited

U.S. PATENT DOCUMENTS

| | | | |
|---|---|---|---|
| 2006/0068278 A1* | 3/2006 | Bloom et al. | 429/176 |
| 2007/0040418 A1* | 2/2007 | Ohkuma et al. | 297/15 |

* cited by examiner

*Primary Examiner* — Basia Ridley
*Assistant Examiner* — Heng Chan
(74) *Attorney, Agent, or Firm* — Fraser Clemens Martin & Miller LLC; J. Douglas Miller

(57) ABSTRACT

A mounting arrangement for a battery pack in a vehicle including the battery pack and a vehicle body, the battery pack including a housing having a hollow interior and a battery assembly disposed in the hollow interior of the housing, wherein the battery assembly includes at least one battery cell and a plurality of rails coupled thereto, and the vehicle body including support rails and a compartment formed therein to receive the battery pack therein, wherein the compartment of the vehicle body supports the housing and the support rails support the rails of the battery assembly to divide a vertical load of the battery pack.

14 Claims, 2 Drawing Sheets

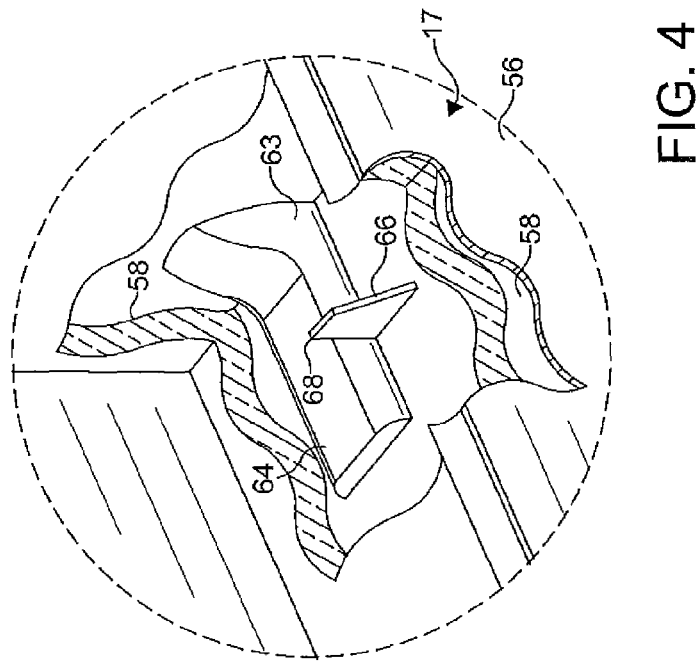
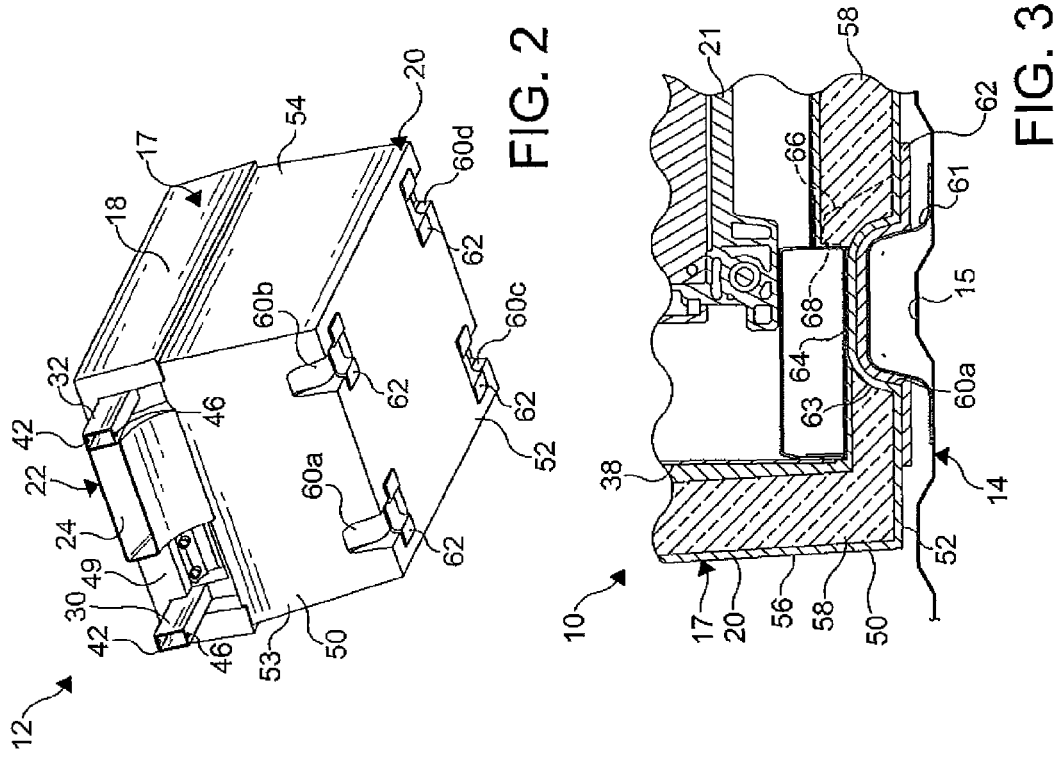

MOUNTING ARRANGEMENT FOR A BATTERY PACK

FIELD OF THE INVENTION

The present invention generally relates to a battery pack, and more particularly to a mounting arrangement of the battery pack in a vehicle.

BACKGROUND OF THE INVENTION

A battery cell has been proposed as a clean, efficient and environmentally responsible power source for electric vehicles and various other applications. One type of battery cell is known as a lithium-ion battery cell. The lithium-ion battery cell is rechargeable and can be formed into a wide variety of shapes and sizes so as to efficiently fill available space in an electric vehicle. A plurality of individual lithium-ion battery cells can be provided in a battery pack to provide an amount of power sufficient to operate the vehicle. Typically, in order to provide a high power density in an efficient package, a large number of battery cells (often much greater than 10) is packaged within an individual battery pack.

Various arrangements are employed to mount the battery pack within the vehicle. Prior art arrangements require a vehicle body having significant strength and mass to support the battery pack in its entirety. Other arrangements can only be used to mount a battery pack that can support its own weight. Therefore, there is a continuing need for an arrangement to mount the battery pack within the vehicle, which can be employed to mount a variety of battery packs in a variety of vehicle bodies.

It would be desirable to develop a mounting arrangement for a battery pack in a vehicle, wherein an effort and cost of manufacturing the vehicle is minimized, and an accessibility, cooling, and protection of the battery pack is maximized.

SUMMARY OF THE INVENTION

In concordance and agreement with the present invention, a mounting arrangement for a battery pack in a vehicle, wherein an effort and cost of manufacturing the vehicle is minimized, and an accessibility, cooling, and protection of the battery pack is maximized, has surprisingly been discovered.

In one embodiment, a battery pack comprises: a housing having a hollow interior; and a battery assembly disposed in the hollow interior of the housing, the battery assembly including at least one battery cell and a rail coupled thereto, wherein the housing and the rail of the battery assembly are supported to divide a vertical load of the battery pack.

In another embodiment, a battery pack comprises: a housing including a first housing portion cooperating with a second housing portion to form a hollow container, the first housing portion including a liner having an inner surface, wherein the liner includes at least one indentation formed therein; and a battery assembly disposed in the hollow container, the battery assembly including at least one battery cell and a plurality of rails coupled thereto, wherein the rails extend laterally outwardly in opposing directions from the battery assembly, and wherein the first housing portion and the rails of the battery assembly are supported by a vehicle body to divide a vertical load of the battery pack.

In another embodiment, a mounting arrangement for a battery pack in a vehicle comprises: a battery pack including a housing having a hollow interior and a battery assembly disposed in the hollow interior of the housing, the housing including a liner having an inner surface and an insulating layer disposed on at least a portion of the inner surface of the liner, wherein the liner includes at least one indentation formed therein, and wherein the battery assembly includes at least one battery cell and a rail coupled thereto substantially parallel to a longitudinal axis thereof and extending laterally outwardly in opposing directions therefrom; and a vehicle body including a compartment having a plurality of support rails and at least one reinforcing member formed thereon, wherein the compartment receives the battery pack therein, and wherein the compartment including the at least one reinforcing member supports the housing of the battery pack and the support rails support the rail of the battery assembly to divide a vertical load of the battery pack.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which:

FIG. 2 is a bottom perspective view of the battery pack illustrated in FIG. 1;

FIG. 3 is an enlarged fragmentary cross-sectional elevational view of the mounting arrangement illustrated in FIG. 1 taken along line 3-3; and FIG. 4 is an enlarged fragmentary perspective view of a portion of the battery pack of the mounting arrangement indicated by circle 4 in FIG. 1, showing a portion of an insulating layer and a side wall of the battery pack cut away.

DETAILED DESCRIPTION OF EXEMPLARY EMBODIMENTS OF THE INVENTION

Figure 1:
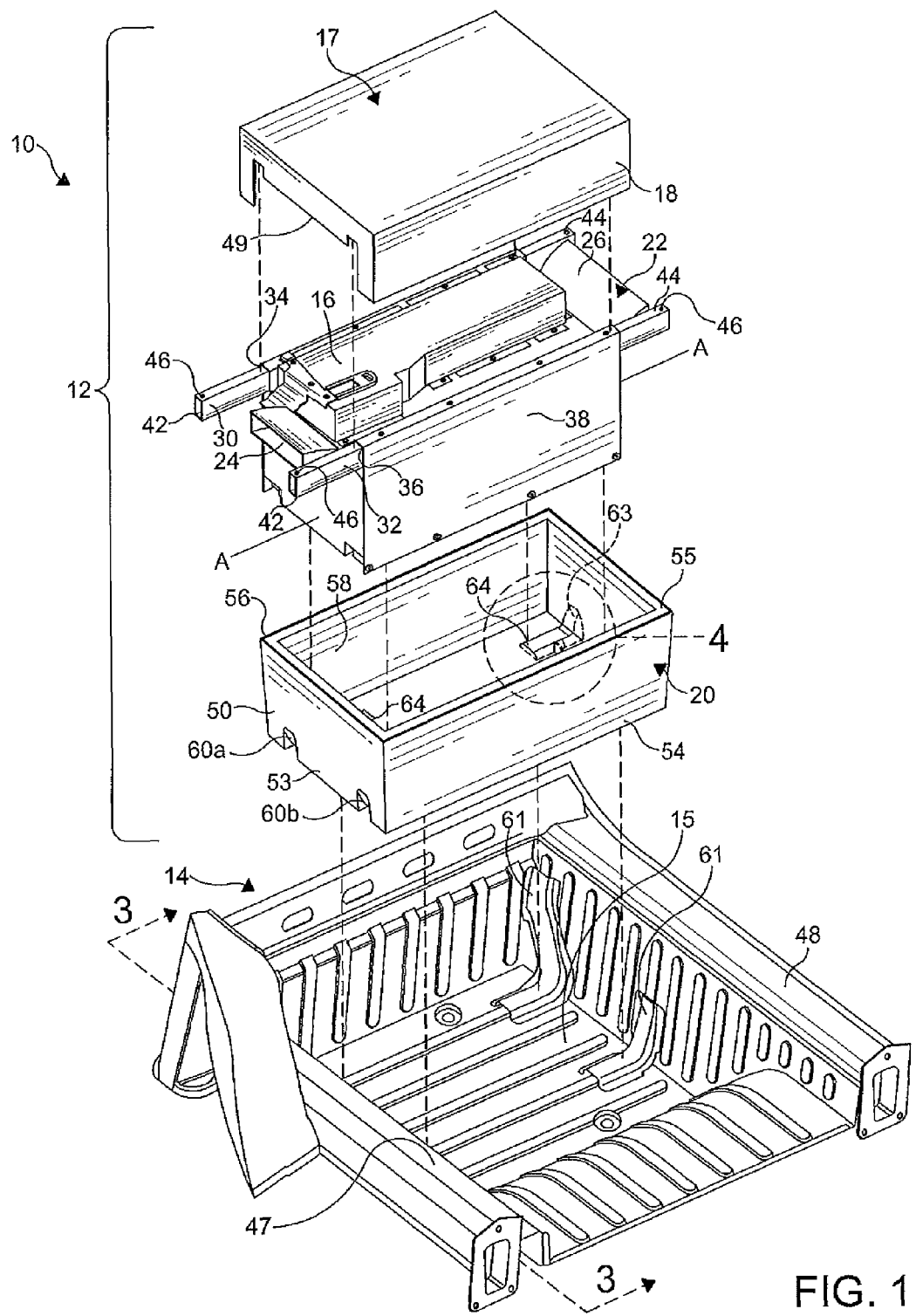
FIG. 1 is a fragmentary exploded top perspective view of a mounting arrangement of a battery pack in a vehicle according to an embodiment of the present invention.

The following detailed description and appended drawings describe and illustrate various embodiments of the invention. The description and drawings serve to enable one skilled in the art to make and use the invention, and are not intended to limit the scope of the invention in any manner.

FIGS. 1 and 3 illustrate a mounting arrangement 10 for a battery pack 12 in a vehicle body 14 of a vehicle (not shown) according to an embodiment of the present invention. It is understood that the mounting arrangement 10 is not limited to use in a vehicle and can be employed in other applications utilizing the battery pack 12 as desired. The mounting arrangement 10 shown provides a desired stiffness and strength to withstand a minimum of thirty-five hertz (35 hz) vibration frequency for a first mode within the vehicle, and knee and shock loads of the vehicle. However, it is understood that the mounting arrangement 10 can have other vibration frequencies. As shown in FIG. 1, a compartment 15 formed in the vehicle body 14 receives the battery pack 12 therein. The compartment 15 allows the vehicle to have a low load floor and a maximum vehicle cargo volume.

The battery pack 12 includes a battery assembly 16 and a housing 17. The battery assembly 16 includes a plurality of series-interconnected battery cells 21, shown in FIG. 3, and a cooling system 22, shown in FIG. 1, for maintaining a desired temperature of the battery assembly 16. It is understood that the battery cells 21 can be any battery cells as desired such as lithium-ion battery cells or nickel-metal hydride battery cells, for example. The cooling system 22 includes an inlet conduit 24 and an outlet conduit 26. It is understood that the conduits 24, 26 can be disposed in any suitable location on the battery assembly 16 as desired. It is further understood that the conduits 24, 26 can be formed from any suitable material as desired such as a plastic material and a metal material, for example.

A pair of spaced apart opposing rails 30, 32 is coupled to the battery assembly 16. The rails 30, 32 are disposed on an upper portion of the battery assembly 16 substantially parallel in respect to a longitudinal axis A of the battery assembly 16. As shown in FIG. 1, the rails 30, 32 are disposed in channels 34, 36 of a tray assembly 38 coupled to the battery assembly 16. It is understood that the tray assembly 38 can be produced from any suitable material as desired such as a metal material, for example. Each of the rails 30, 32 includes a first end 42 and a second end 44. The ends 42, 44 of the rails 30, 32 extend laterally outwardly in opposing directions from the battery assembly 16. The inlet conduit 24 is positioned between the ends 42 and the outlet conduit 26 is positioned between the ends 44 to maximize an available space for the conduits 24, 26. It is understood that the inlet conduit 24 can be positioned between the ends 44 and the outlet conduit 26 can be positioned between the ends 42 if desired. Each of the ends 42, 44 shown include an aperture 46 formed therein to receive a fastener (not shown) therein for coupling the battery pack 12 to support rails 47, 48 of the vehicle body 14. It is understood, however, that the ends 42, 44 can be coupled to the support rails 47, 48 of the vehicle body 14 by any means as desired such as by a weld, an adhesive, a clamp, a bracket, and the like, for example. In a non-limiting example, the support rails 47, 48 support the rails 30, 32 to carry about seventy percent (70%) of a vertical load exerted on the vehicle body 14 by the battery pack 12.

As illustrated in FIG. 2, the housing 17 includes a first housing portion 18 and a second housing portion 20. The first housing portion 18 cooperates with the second housing portion 20 to form a hollow container for receiving the battery assembly 16 therein. In the embodiment shown, the first housing portion 18 is a cover for the second housing portion 20. Opposing sidewalls 49 of the first housing portion 18 are shaped to receive the rails 30, 32 and the conduits 24, 26 of the battery assembly 16 therein. It is understood that the first housing portion 18 can have any size and shape as desired. The second housing portion 20 has a shape and size suitable to be received in the compartment 15 of the vehicle body 14. It is understood, however, that the second housing portion 20 can have any shape and size as desired.

The second housing portion 20 includes a liner 50 having a bottom wall 52 and sidewalls 53, 54, 55, 56. The liner 50 shown is produced from a waterproof plastic material to militate against damage to the battery assembly 16 such as during a flooding of the vehicle body 14, for example. In a non-limiting example, a thickness of the liner 50 is about 2.5 mm. It is understood that the thickness of the liner 50 can be any thickness as desired. An insulating layer 58 is provided in at least a portion of an inner surface of the walls 52, 53, 54, 55, 56. In the embodiment shown in FIG. 3, the insulating layer 58 is disposed adjacent the tray assembly 38 to partially surround the battery assembly 16 and minimize heat loss therefrom. In a non-limiting example, a thickness of the insulating layer is about 23 mm. It is understood that the insulating layer 58 can have any thickness as desired.

Referring now to FIG. 2, a lower portion of the liner 50 includes indentations 60a, 60b, 60c, 60d formed therein. In the embodiment shown, two generally arcuate-shaped indentations 60a, 60b are formed in the bottom wall 52 extending into the sidewall 53 and two generally arcuate-shaped indentations 60c, 60d are formed in the bottom wall 52 extending into the sidewall 55. It is understood, however, that the indentations 60a, 60b, 60c, 60d can have any shape and size as desired. The indentations 60a, 60b, 60c, 60d shown receive a portion of respective reinforcing members 61 disposed in the compartment 15 of the vehicle body 14 therein. The reinforcing members 61 militate against a movement and a twisting of the battery pack 12 in the vehicle body 14. It is understood that the reinforcing members 61 can be affixed to the vehicle body 14 by any means as desired such as by a weld, an adhesive, a clamp, a bracket, and the like, for example. It is further understood that the reinforcing members 61 can be integrally formed with the vehicle body 14 if desired. In a non-limiting example, the compartment 15, including the reinforcing members 61, of the vehicle body 14 support the second housing portion 20 to carry about thirty percent (30%) of the vertical load exerted on the vehicle body 14 by the battery pack 12.

As illustrated in FIG. 3, an isolator 62 is disposed between each of the indentations 60a, 60b, 60c, 60d and the reinforcing members 61. The isolators 62 are produced from an elastic material such as an elastomer, for example, to permit at least a portion of the isolators 62 to distend from a first position (not shown) prior to assembly of the battery pack 12 within the compartment 15 of the vehicle body 14 to a second position sandwiched between the reinforcing members 61 and the liner 50. The isolators 62 provide a cushion between the reinforcing members 61 and the liner 50 to minimize wear and damage (e.g. a puncture) to the liner 50. The isolators 62 also minimize a noise and a vibration produced by the battery pack 12 when disposed in the vehicle body 14.

As shown in FIGS. 1 and 3, the indentations 60a, 60b, 60c, 60d form corresponding raised portions 63 projecting inward into an interior of the liner 50. Each of the raised portions 63 includes a substantially planar upper surface 64. A rib 66 is formed on the liner 50 adjacent an inner surface of each of the raised portions 63. It is understood that the ribs 66 can be formed integrally with the raised portions 63 if desired. It is further understood that the ribs 66 can be formed elsewhere on the liner 50 if desired. Each of the ribs 66, as shown in FIG. 4, is generally triangular shaped and extends upwardly above the raised portion 63 to form a shoulder 68. It is understood that the ribs 66 can have any shape, size, and thickness as desired.

As illustrated in FIG. 3, a substantially vertical surface of the shoulder 68 contacts an inner surface of the tray assembly 38 of the battery assembly 16. The shoulder 68 militates against a movement of the battery assembly 16 within the housing 17 and transfers a shear load of the battery assembly 16 from the raised portion 63 to the tray assembly 38. In the embodiment shown, the insulating layer 58 is disposed at least partially around the ribs 66 and the raised portions 63, leaving the upper surface 64 of the raised portions 63 exposed to receive the tray assembly 38 of the battery assembly 16 thereon.

To assemble, the battery assembly 16 is disposed in the second housing portion 20 of the housing 17. The raised portions 63 receive and at least partially support the battery assembly 16 thereon. The first housing portion 18 is then placed atop of the second housing portion 20 to provide a cover to the battery assembly 16 and form the battery pack 12. Thereafter, the battery pack 12 is then disposed within the compartment 15 of the vehicle body 14. The reinforcing members 61 are received in the indentations 60a, 60b, 60c, 60d of the liner 50. Accordingly, the isolators 62 are caused to distend from the first position to the second position between the reinforcing members 61 and the liner 50. The battery pack 12 is then secured in the compartment 15 by affixing the ends 42, 44 of the rails 30, 32 to the support rails 47, 48 of the vehicle body 14.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A battery pack comprising:
   a housing having a hollow interior;
   a battery assembly disposed in the hollow interior of the housing, the battery assembly including at least one battery cell and a rail coupled thereto, wherein the housing is configured to support a portion of a vertical load of the battery pack and the rail of the battery assembly is configured to support a portion of the vertical load of the battery pack; and
   wherein the housing includes at least one raised portion formed therein to receive and at least partially support the battery assembly thereon and a rib formed adjacent the at least one raised portion to form a shoulder, wherein the shoulder transfers a shear load of the battery assembly from the at least one raised portion to a tray assembly of the battery assembly.

2. The battery pack according to claim 1, wherein the housing includes at least one indentation formed therein to receive an isolator therein.

3. The battery pack according to claim 1, wherein the housing includes a liner having an inner surface and an insulating layer disposed on at least a portion of the inner surface of the liner.

4. The battery pack according to claim 1, wherein the rail is coupled to the battery assembly substantially parallel to a longitudinal axis of the battery assembly.

5. The battery pack according to claim 1, wherein the rail extends laterally outwardly in opposing directions from the battery assembly.

6. The battery pack according to claim 1, wherein the rail cooperates with support rails of a vehicle to support at least a portion of the vertical load of the battery pack.

7. A battery pack comprising:
   a housing including a first housing portion cooperating with a second housing portion to form a hollow container, the second housing portion including a liner having an inner surface, wherein the liner includes at least one indentation formed therein;
   a battery assembly disposed in the hollow container, the battery assembly including at least one battery cell and a plurality of rails coupled thereto, wherein the rails extend laterally outwardly in opposing directions from the battery assembly and are configured to support a portion of a vertical load of the battery pack, and wherein the hollow container is configured to support a portion of a vertical load of the battery pack; and
   wherein the at least one indentation includes at least one raised portion to receive and at least partially support the battery assembly thereon, and wherein the second housing portion includes a rib formed adjacent the at least one raised portion to form a shoulder, wherein the shoulder transfers a shear load of the battery assembly from the at least one raised portion to a tray assembly of the battery assembly.

8. The battery pack according to claim 7, wherein at least a portion of the inner surface of the liner includes an insulating layer disposed thereon.

9. The battery pack according to claim 7, wherein the vehicle body includes at least one reinforcing member formed thereon.

10. The battery pack according to claim 7, wherein an isolator is disposed between the liner and the vehicle body.

11. The battery pack according to claim 7, wherein the rails are coupled to the battery assembly substantially parallel to a longitudinal axis of the battery assembly.

12. The battery pack according to claim 7, wherein the rails cooperate with support rails of the vehicle body to support at least a portion of the vertical load of the battery pack.

13. A mounting arrangement for a battery pack in a vehicle comprising:
   a battery pack including a housing having a hollow interior and a battery assembly disposed in the hollow interior of the housing, the housing including a liner having an inner surface and an insulating layer disposed on at least a portion of the inner surface of the liner, wherein the liner includes at least one indentation formed therein, wherein the battery assembly includes at least one battery cell and a rail coupled thereto substantially parallel to a longitudinal axis thereof and extending laterally outwardly in opposing directions therefrom, and wherein the at least one indentation includes at least one raised portion to receive and at least partially support the battery assembly thereon, wherein the liner includes a rib formed adjacent the at least one raised portion to form a shoulder, wherein the shoulder transfers a shear load of the battery assembly from the at least one raised portion to a tray assembly of the battery assembly; and
   a vehicle body including a compartment having a plurality of support rails and at least one reinforcing member formed thereon, wherein the compartment receives the battery pack therein, and wherein the compartment including the at least one reinforcing member is configured to support a portion of a vertical load of the battery pack and the support rails are configured to support a portion of the vertical load of the battery pack.

14. The mounting arrangement according to claim 13, wherein an isolator is disposed between the liner and the vehicle body.

* * * * *